United States Patent
Drexl et al.

[11] Patent Number: 6,142,909
[45] Date of Patent: Nov. 7, 2000

[54] DEVICE FOR CONTROLLING A STARTING PROCESS OF A MOTOR VEHICLE

[75] Inventors: Hans-Jürgen Drexl, Schonungen; Winfried Stürmer, Euerbach; Martin Dettmar, Geldersheim, all of Germany

[73] Assignee: Mannesmann Sachs AG, Schweinfurt, Germany

[21] Appl. No.: 09/199,743

[22] Filed: Nov. 25, 1998

[30] Foreign Application Priority Data

Nov. 26, 1997 [DE] Germany .......................... 197 52 276

[51] Int. Cl.$^7$ .................................................. B60K 41/28
[52] U.S. Cl. .................................................. 477/91
[58] Field of Search ........................................ 477/90, 91

[56] References Cited

U.S. PATENT DOCUMENTS

| | | | |
|---|---|---|---|
| 2,257,615 | 9/1941 | McCullough | 477/90 |
| 4,632,231 | 12/1986 | Hattori et al. | 192/103 R X |
| 5,733,219 | 3/1998 | Rettig et al. | 477/91 |

FOREIGN PATENT DOCUMENTS

| | | | |
|---|---|---|---|
| 323-070 | 7/1989 | European Pat. Off. | 477/91 |
| 39 37 692 | 5/1991 | Germany | B60K 41/02 |
| 44 09 122 A1 | 2/1995 | Germany | B60K 41/02 |

*Primary Examiner*—Charles A. Marmor
*Assistant Examiner*—Roger Pang
*Attorney, Agent, or Firm*—Cohen, Pontani, Lieberman & Pavane

[57] ABSTRACT

Device for controlling a starting process, which comprises an engine equipped with a power regulating element. The position of the power regulating element, which is equipped with an actuator, can be controlled by a control device, to which signals are sent indicating the activation position of an accelerator pedal as well as the speed of a crankshaft of the engine. The crankshaft can be connected via a clutch to a gear input shaft. When a predetermined speed limit value of the crankshaft is reached, the actuator of the power regulating element can be activated by the control device for the purpose of limiting the crankshaft speed. A clutch pedal is provided, by means of whose activation the starting process can be controlled.

22 Claims, 2 Drawing Sheets

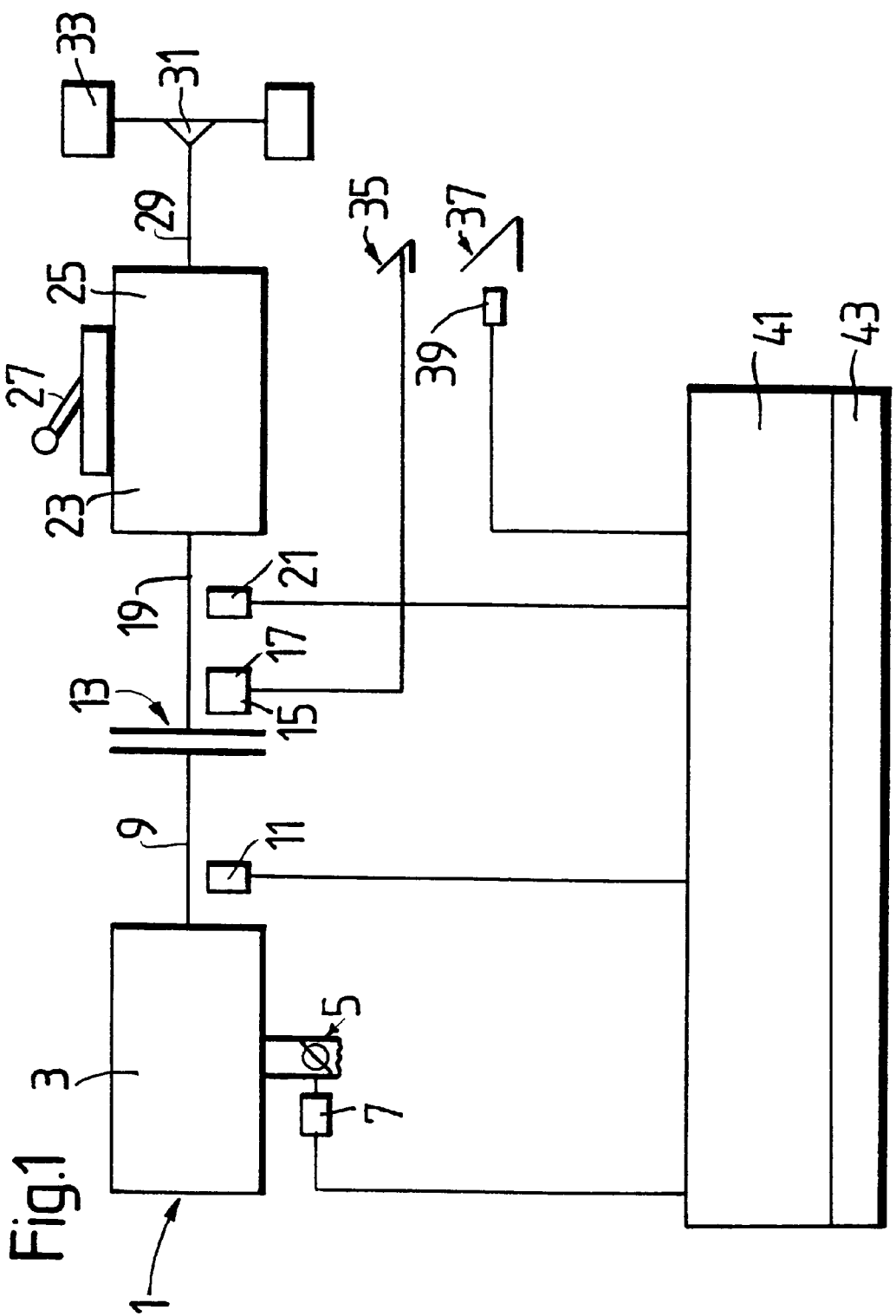

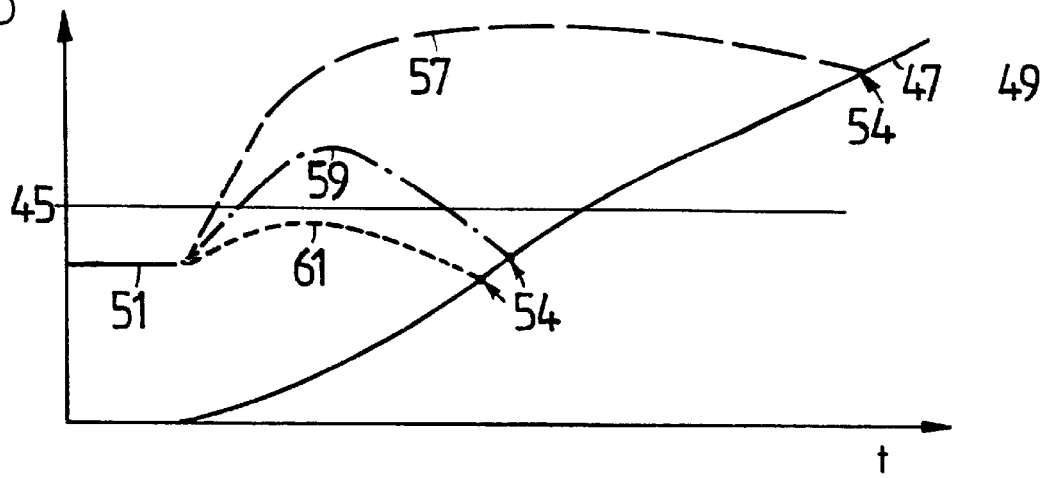
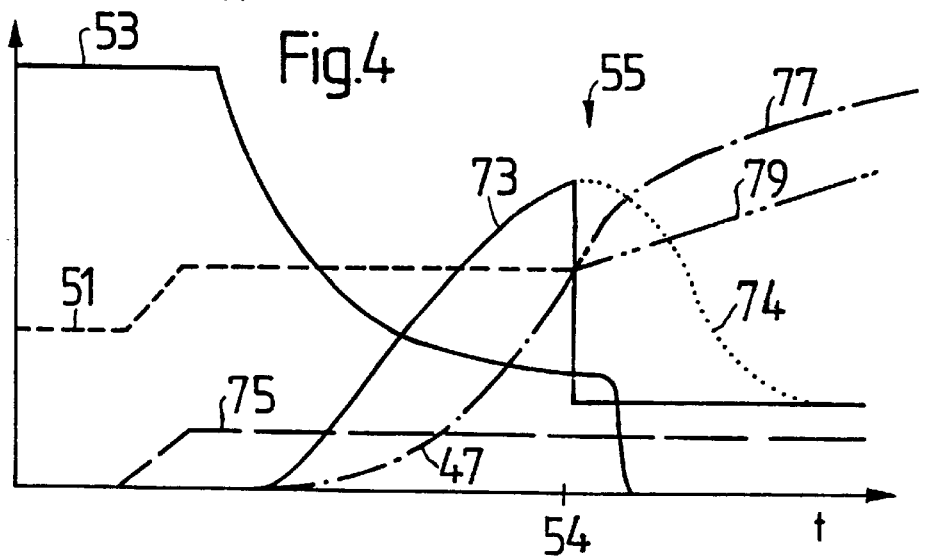

DEVICE FOR CONTROLLING A STARTING PROCESS OF A MOTOR VEHICLE

BACKGROUND OF THE INVENTION

1. Field of the Invention

The invention relates to a device for controlling a starting process of a motor vehicle including an engine with a crankshaft connectable to a gear input shaft via a clutch. The device also includes a power regulating element having an actuator is connected to the engine for limiting the crankshaft speed. The position of the power regulating element is controlled by a control device which receives input signals representing an activation position of an accelerator pedal and a speed of a crankshaft of the engine.

2. Description of the Related Art

Prior art reference DE 44 09 122 A1 discloses a prior art device and a process for controlling a starting process of a motor vehicle. The device comprises an engine with a power regulating element. The crankshaft of the engine is connectable to a gear input shaft via a clutch equipped with an electronic coupling system. The device also includes a control device for controlling at least the power regulating element and the coupling system. Signals representing at least the position of the throttle valve and the slip in the clutch and signals indicating the currently engaged gear are transmitted to the control device. When the starting gear is engaged and a desire to start is signalled, the power regulating element is activated for providing a predetermined target value of the crankshaft speed. This predetermined target value depends on the activation and activation gradients of the accelerator pedal. As the throttle valve signal increases and the throttle valve acceleration increases, the target speed rises. When the target speed is almost reached or when a predetermined minimum speed is exceeded, the control device begins engagement of the clutch by activating the electronic coupling system according to the predetermined target speed. After the electronic coupling system is activated, the clutch is gradually engaged so that slip is reduced in accordance with a predetermined curve until the clutch is completely engaged.

A problem with this prior art device is that during a clutch engagement process at a high target speed, a high rotational speed difference of the clutch between the crankshaft and the gear input shaft must be reduced. If the clutch is engaged rapidly, comfort is impaired. Moreover, the clutch is heavily loaded during the engagement process as a result of the high rotational speed difference that must be adjusted. In addition, this prior art control device is only implemented in complex systems that comprise an electronic coupling system.

SUMMARY OF THE INVENTION

The object of the invention is to create a device for controlling a starting process of a motor vehicle in which the load on the friction clutch during starting is reduced compared to the prior art.

The object of the invention is attained by a device for controlling a starting process for a motor vehicle having an engine with a power regulating element. The power regulating element has an actuator that is controllable by a control device that receives signals representing the activation position of a gas or accelerator pedal and the speed of a crankshaft of the engine. The crank shaft is connectable to a gear input shaft via a clutch. The actuator of the power regulating element is activatable by a control device when a predetermined speed limit value of the crankshaft is reached. Therefore, the actuator may be activated for limiting the crankshaft speed, thereby preventing the occurrence of high crankshaft speeds due to almost maximum activation of the accelerator pedal. The predetermined speed limit value of the crankshaft speed may also be determined in response to the currently engaged gear for starting. For example, if the driver has selected second gear, the speed limit value is preferably established in such a way that starting is then possible only in special situations, e.g., on a down hill incline. The driver is therefore obliged to start in the starting gear intended for starting.

The rotational speed difference in the clutch is limited to the extent that the crankshaft speed is limited. When the clutch engagement process occurs, this rotational speed difference is reduced until the speed of the gear input shaft increases to the crankshaft speed. In general, the length of time during which a clutch slips depends on the engagement speed of the clutch and the rotational speed difference. A larger rotational speed difference will produce longer durations of clutch slip. During slip operation, the clutch is heavily loaded due to the friction heat that arises. Thus, limiting the crankshaft speed reduces the load on the clutch, because the maximum possible rotational speed difference is limited to the predetermined speed limit value. The moment transmitted via the clutch to the gear input shaft and the gear input shaft speed may be controlled by the activation position and activation speed of the clutch pedal. The starting speed of the vehicle depends on the gear input shaft speed and the selected translation ratio in the transmission. Thus, the driver can control the starting process at least by the manner in which he operates the clutch pedal which affects the gear input shaft speed.

In a preferred embodiment of the present invention, a data memory in which speed limit values and corresponding data are stored is connected to the control device.

In another embodiment, the predetermined speed limit value lies in a range in which the engine delivers its maximum moment. With this speed limit value, the maximum engine moment is provided during starting. This embodiment may be used, for example, for starting up an incline and prevents undesired revving of the engine when the moment required to be transmitted via the clutch is smaller than the engine moment. If necessary, however, the maximum moment of the engine may still be provided because the speed limit value is within the range of maximum moment.

To reduce the load even further, a further embodiment provides a speed limit value that lies below the speed at which the engine delivers its maximum moment. This embodiment ensures that the rotational speed difference is lower in the friction phase. The work consumed by friction in the clutch is therefore reduced which reduces wear on the clutch parts, particularly the clutch linings. In addition, the moment induced by the engine is lower in this embodiment which reduces the danger of uncontrolled slip-through under full pressure force. Furthermore, it has proved advantageous to raise the predetermined engine speed to a higher value at which a higher moment is provided by the engine after an interrupted starting attempt.

It is also possible to completely nullify the engine speed limit. In this way, the maximum moment may be provided, as needed, under extreme conditions such, for example, as starting on a steep incline. The centrifugal mass of the engine may also be used to increase the starting moment. It is also advantageous to permit this modification of the predetermined speed limit value only after an interrupted starting attempt with a high clutch moment or after an interrupted starting attempt with a stalled engine, so that the modification of the speed limit value occurs only in situations in which a higher moment is actually necessary for starting. A starting process is considered interrupted as soon as the driver reduces the clutch moment to prevent the engine from stalling.

A further embodiment includes an operating element having an activation position that may be manually operated to nullify the limit of the crankshaft speed. In this embodiment, the driver is able to start appropriately up an incline by using the operating element without first interrupting a starting attempt.

The device according to the invention may also monitor parameters that characterize the behavior of the driver over time and determine the speed limit in response to these parameters. For example, if a driver frequently starts in high gears so that the clutch is often operated with long slip times during engagement, the clutch is subjected to an above-average load. In this case, a smaller speed limit value is established by the control device in dependence on the duration of slip. This dependence on the parameters that characterize the behavior of the driver ensures that the total load on the clutch over the useful life of all motor vehicles remains almost constant. In other words, if starts are rare such as during long-distance travel, then the driver is free to start at a high engine speed because the clutch linings will nonetheless survive longer than the useful life of the engine. However, when starts are frequent such as in city traffic or at construction sites, the control device sharply limits the starting speed. The limited starting speed limits the starting moment so that the driver is required to start in low gears. The clutch linings are therefore preserved so that they can attain a satisfactory useful life.

Other parameters that characterize the behavior of the driver include throttle position during the starting procedure. If a driver frequently starts at full throttle so that a higher moment induced by the engine is applied in the clutch, then, depending on the clutch activation, high speeds of the crankshaft are frequently reached. Thus, the device of the present invention will lower the speed limit so that the power regulating device takes effect often. In contrast, if the driver is an experienced driver who operates the gas pedal and clutch pedal in such a way that the speed limit value is seldom reached, the establishment of a higher speed limit value will not lead to a higher load on the clutch, seen over the useful life of the motor vehicle. For this reason a lower speed limit value is set when the driving mode is such that starting processes with an almost completely activated gas pedal are frequent. This way, despite the manner of vehicle operation, the increased clutch load that would otherwise occur is prevented or at least reduced.

The predetermined speed limit value may also depend on parameters that characterize the driving mode, such as the frequency of starts which may indicate whether the car is driven in city traffic or on the highway. When starts are less frequent, relative to the operating time and/or kilometers travelled, it is advantageous to establish a higher speed limit value. These different speed limit values which depend on different parameters and/or data corresponding to the speed limit values, are stored in a characteristic field in a data memory array, to which the control device has access.

In another advantageous embodiment, the crankshaft speed during the starting process depends on the gas pedal position. In this embodiment, the actuator that sets the crankshaft speed is activated in such a way as to regulate the crankshaft speed to a target speed corresponding to the given gas pedal position. By operating the clutch pedal, the driver controls the starting process. As a result, an inexperienced driver needs only concentrate on the activation of the clutch pedal. Thanks to this simplified operation of the motor vehicle, it is possible for even an inexperienced driver to easily attain a smooth start.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1 is a schematic diagram of a device for controlling a starting process for a motor vehicle according to an embodiment of the present invention;

FIG. 2 is a diagram illustrating the speed behavior of the crankshaft relative to the gear input shaft according to the prior art;

FIG. 3 is a full load curve of an engine moment of the device of FIG. 1 with respect to crankshaft speed; and FIG. 4 is a diagram of different parameters of a starting process according to the device of the present invention plotted over time.

DETAILED DESCRIPTION OF THE PRESENTLY PREFERRED EMBODIMENTS

FIG. 1 shows a drive arrangement 1 for a motor vehicle with an engine 3 that is equipped with a power regulating element 5. The position of the power regulating element 5 is set by an actuator 7 that is controlled by a control device 41. The engine 3 further comprises a crankshaft 9 that is connectable to a gear input shaft 19 of a manual transmission 25 via a manually operable clutch 13. The activation position or clamp load of the clutch 13 is predetermined by a clutch pedal 35 operated by the driver via an actuator 15. The transmission 25 is operable by a gear-shift lever 27. A gear output shaft 29 of the manual transmission 25 is in active connection with driving wheels 33 with intermediate connection of a differential 31. To signal the desire to start movement of the motor vehicle in which the drive arrangement 1 is mounted, a gas pedal 37 is equipped with a sensor 39. The signals output from this sensor 39 are transmitted to the control device 41. The control device 41 also receives the signals from a crankshaft sensor 11 which senses the rotational speed of crankshaft 9 and a gear input shaft sensor 21 which senses the rotational speed of the gear input shaft 19. Instead of the gear input shaft sensor 21, a gear output shaft sensor or a driving speed detector may also be used. Moreover, a variety of other sensors such, by way of non-limiting example, as a power regulating element sensor, a gear identification sensor 23, and a clutch position sensor 17 may be provided, whose signals are transmitted to the control device 41. The control device 41 accesses data stored in a data memory 43 and controls the position of at least the power regulating element 5 in response to the received signals during the starting process of the motor vehicle.

After turning on the engine 3, a driver signals his desire to start the vehicle by operating the gas pedal 37 with an open clutch 13 and a stationary or nearly stationary vehicle. In response to the operation of the gas pedal 37 which is sensed by sensor 39, the actuator 7 of the power regulating element 5 is activated for placing the power regulating element 5 in a position associated with the given gas pedal position. The speed of the crankshaft 9 initially increases as a function of the position of the power regulating element 5. The crankshaft speed thereby increases in dependence on the moment delivered by the engine 3 which accelerates the inert mass of the crankshaft 9. If the clutch 13 is subsequently engaged by activation of the clutch pedal 35, then the increase in the crankshaft speed is reduced by the friction moment arising in the clutch 13.

FIG. 2 shows different prior art starting curves of the crankshaft speed 51 over time, during starting processes of the motor vehicle without the device according to the invention for three different driver styles. Curve 47 represents the speed of the gear input shaft 19 measured directly by sensor 21, or indirectly with sensor 11, or other sensors for sensing the driving speed. Curve 61 represents the crankshaft speed 51 during a starting process for an experienced driver. As a result of the activation of the accelerator pedal 37 and the clutch pedal 35 in dependence on each other, the crankshaft speed 51 does not reach a predetermined speed limit value 45.

The curve of the crankshaft speed 51 during a starting process for an average driver is shown at 59. The crankshaft speed 51 exceeds the predetermined limit value 45. The synchronization point 54, at which the crankshaft speed 51 equals the gear input shaft speed 47, is reached after a longer slip operation of the clutch 37 than the slip operation of the experienced driver.

The curve of the crankshaft speed 51 of a starting process for an inexperienced driver is shown by 57. In this starting process, the clutch 13 is operated with slip over a substantially longer period of time, compared to the starting process with an experienced driver. The higher rotational speed difference and longer friction time result in more work consumed by friction, which contributes to significantly higher clutch lining wear.

The resulting increase in the gear input shaft speed 47 is the same for each driver. The time axis for the depicted types of starting processes is identical. The synchronization point 54 signifies the end of the starting process.

In FIG. 3, the available engine moment full-load curve 71 is shown over the range of crankshaft speed 51. The engine moment 71 increases as the crankshaft speed increases from an idle speed 63 and up to a speed 65. The engine moment declines again at crankshaft speeds higher than speed 65. The standard predetermined speed limit value 45 is variable in a range 69 and depends on the driver behavior as well as the driving mode. If the driver frequently starts with an almost fully activated gas pedal 37, the predetermined speed limit value 45 is moved toward lower speed values such for example, as toward position 67. However, if the vehicle travels mainly on autobahns, interstate highways, or other long-distance trips and has fewer starting processes relative to the number of kilometers traveled, then the predetermined limit speed value 45 is moved toward higher speeds of range 69. Preferably, over a predetermined period of time or a predetermined number of kilometers traveled, averaged values are used to establish the predetermined speed limit value 45. A new speed limit value 46 for extreme situations is found closer to or proximate the speed 65 at which the maximum moment can be provided by the engine 3. For example, a higher engine moment is required for starting on an incline, especially with a fully loaded vehicle. The required moment can be provided by the device of the basis on the new speed limit value 46. After the stalling of an engine with high clutch moment, the new speed limit value 46 is automatically used by the control device in the embodiment shown.

Referring now to FIG. 4, a basic starting process 55 of an embodiment according to the present invention is described, in which the crankshaft speed during the starting process is controlled via the accelerator pedal position. The activation paths of the gas pedal position 75 and the clutch pedal position 53 are plotted over time. Further, the crankshaft speed 51 and the gear input shaft speed 47 are also shown, whereby the speed related to these two curves is plotted on the vertical axis. In addition, the moment 73 transmitted by the clutch in dependence on the clutch pedal position 53 is shown over time The engine delivers that movement 73 at the speed 51 which depends on the accelerator pedal position. Since the units of measurement are different for each of these parameters, each of the activation paths and curves are shown merely to illustrate how each increases and decreases over time and do not depict actual measures.

In dependence on the gas pedal deflection 75, the control device 41 establishes a crankshaft speed 51 and activates the actuator 7 of the power regulating element 5. The clutch 13 is slowly engaged in keeping with the clutch position or the position of the clutch pedal 53. The gear input shaft 19 is accelerated by the engine moment transmitted via the clutch 13. At the synchronization point 54, the crankshaft speed 51 equals the gear input shaft speed 47 and the driver can engage the clutch completely. When the synchronization point 54 is reached, the speed control changes into torque control and the acceleration of the vehicle no longer depends on the clutch position 53, but rather on the gas pedal position 75. In this transition from establishing the desired acceleration by the activation position of the clutch pedal 35 to the gas pedal 37, abrupt changes in the moment 73 may occur. Such a change in acceleration may be felt by the driver as a jolt, to a greater or lesser extent. The abrupt torque change between curves 47 and 79 generates an abrupt input shaft speed change and can excite vibrations in the drive train. To attain a comfortable transition from the control of the acceleration depending on the position of the clutch pedal 35 to the gas pedal 37, a bridge control is provided in the control device 41 for controlling the transition of the engine moment 73 toward the value corresponding to the gas pedal position immediately following the synchronization point. The bridge control adapt the moment gradually after synchronization 54 so that the increase in the gear input shaft speed 77 after the synchronization point is a steady continuation of the rise in gear input shaft speed 47 before the synchronization point 54.

The invention is not limited by the embodiments described above which are presented as examples only but can be modified in various ways within the scope of protection defined by the appended patent claims.

We claim:

1. A device for controlling a starting process of a motor vehicle, comprising:

an engine having a power regulating element and a crankshaft connectable to a gear input shaft of a transmission via a clutch, the starting process being controllable by activation of the clutch;

said power regulating element having an actuator operatively connectable to the engine for regulating a rotational speed of the crankshaft;

a control device operatively connected for receiving signals representing an activation position of an accelerator pedal of the motor vehicle and the speed of the crankshaft; and said control device operatively connected to said power regulating element for activating said actuator when the speed of said crankshaft reaches a predetermined speed limit value to limit the speed of said crankshaft to said predetermined speed limit value during the starting process, wherein said control device is operatively connected for monitoring parameters of said motor vehicle over time that characterize a predominant driving mode of the motor vehicle, said control device determining said predetermined speed limit value in response to said parameters, and said predetermined speed limit value being in a range between an idle speed of said engine and a speed at which said engine delivers its maximum moment, and wherein said predetermined speed limit value is in a range of the crankshaft speed in which the engine delivers its maximum moment.

2. The device for controlling a starting process of claim 1, further comprising a data memory connected to said control device, wherein said predetermined speed limit value is stored in said data memory.

3. The device for controlling a starting process of claim 1, further comprising a data memory connected to said control device, said predetermined speed limit value being stored in said data memory, and wherein said data memory comprises a data field for storing different speed limit values corresponding to said parameters.

4. The device for controlling a starting process of claim 1, further comprising an operating element connected to said control device for selectively nullifying said predetermined speed limit.

5. The device for controlling a starting process of claim 1, wherein said control device is operatively connected for activating said actuator for maintaining said crankshaft speed to said predetermined speed in response to receiving a signal indicating that said crank shaft has reached said predetermined speed limit during the starting process.

6. The device for controlling a starting process of claim 1, wherein said control device further comprises a transition controller for ensuring a continuous transition of the engine moment to the value corresponding to the accelerator pedal position immediately following the point at which a synchronous speed of said crankshaft and said gear input shaft is reached.

7. A device for controlling a starting process of a motor vehicle, comprising:

an engine having a power regulating element and a crankshaft connectable to a gear input shaft of a transmission via a clutch, the starting process being controllable by activation of the clutch;

said power regulating element having an actuator operatively connectable to the engine for regulating a rotational speed of the crankshaft;

a control device operatively connected for receiving signals representing an activation position of an accelerator pedal of the motor vehicle and the speed of the crankshaft; and said control device operatively connected to said power regulating element for activating said actuator when the speed of said crankshaft reaches a predetermined speed limit value to limit the speed of said crankshaft to said predetermined speed limit value during the starting process, wherein said control device is operatively connected for monitoring parameters of said motor vehicle over time that characterize a predominant driving mode of the motor vehicle, said control device determining said predetermined speed limit value in response to said parameters, and said predetermined speed limit value being in a range between an idle speed of said engine and a speed at which said engine delivers its maximum moment, and wherein said control device is operatively connected for establishing a higher predetermined speed limit value after an interrupted starting attempt with high clutch moment.

8. A device for controlling a starting process of a motor vehicle, comprising:

an engine having a power regulating element and a crankshaft connectable to a gear input shaft of a transmission via a clutch, the starting process being controllable by activation of the clutch;

said power regulating element having an actuator operatively connectable to the engine for regulating a rotational speed of the crankshaft;

a control device operatively connected for receiving signals representing an activation position of an accelerator pedal of the motor vehicle and the speed of the crankshaft; and said control device operatively connected to said power regulating element for activating said actuator when the speed of said crankshaft reaches a predetermined speed limit value to limit the speed of said crankshaft to said predetermined speed limit value during the starting process, wherein said control device is operatively connected for monitoring parameters of said motor vehicle over time that characterize a predominant driving mode of the motor vehicle, said control device determining said predetermined speed limit value in response to said parameters, and said predetermined speed limit value being in a range between an idle speed of said engine and a speed at which said engine delivers its maximum moment, and wherein said control device is operatively connected for establishing a higher predetermined speed limit value after an interrupted starting process.

9. The device for controlling a starting process of claim 8, wherein said control device is operatively connected for activating said actuator for maintaining said crankshaft speed to said predetermined speed during unreduced activation of said accelerator pedal during the starting process.

10. A device for controlling a starting process of a motor vehicle, comprising:

an engine having a power regulating element and a crankshaft connectable to a gear input shaft of a transmission via a clutch, the starting process being controllable by activation of the clutch;

said power regulating element having an actuator operatively connectable to the engine for regulating a rotational speed of the crankshaft;

a control device operatively connected for receiving signals representing an activation position of an accelerator pedal of the motor vehicle and the speed of the crankshaft; and said control device operatively connected to said power regulating element for activating said actuator when the speed of said crankshaft reaches a predetermined speed limit value to limit the speed of said crankshaft to said predetermined speed limit value during the starting process, wherein said control device is operatively connected for monitoring parameters of said motor vehicle over time that characterize a predominant driving mode of the motor vehicle, said control device determining said predetermined speed limit value in response to said parameters, and said predetermined speed limit value being in a range between an idle speed of said engine and a speed at which said engine delivers its maximum moment, and wherein said control device is operatively connected for nullifying said predetermined speed limit after detection of an interrupted starting process or starting attempt.

11. A device for controlling a starting process of a motor vehicle, comprising:

an engine having a power regulating element and a crankshaft connectable to a gear input shaft of a transmission via a clutch, the starting process being controllable by activation of the clutch;

said power regulating element having an actuator operatively connectable to the engine for regulating a rotational speed of the crankshaft;

a control device operatively connected for receiving signals representing an activation position of an accelerator pedal of the motor vehicle and the speed of the crankshaft; and said control device operatively connected to said power regulating element for activating said actuator when the speed of said crankshaft reaches a predetermined speed limit value to limit the speed of said crankshaft to said predetermined speed limit value during the starting process, wherein said control device is operatively connected for monitoring parameters of said motor vehicle over time that characterize a behavior of a driver of the motor vehicle, said control device determining said predetermined speed limit value in response to said parameters, and wherein said control device is operatively connected for activating said actuator in response to a start signal for setting said crankshaft speed to said predetermined speed limit that is predetermined in response to the activation position of the accelerator pedal.

12. The device for controlling a starting process of claim 11, further comprising a data memory connected to said control device, wherein said predetermined speed limit value is stored in said data memory.

13. The device for controlling a starting process of claim 11, wherein said predetermined speed limit value is in a range of the crankshaft speed in which the engine delivers its maximum moment.

14. The device for controlling a starting process of claim 11, further comprising a data memory connected to said control device, said predetermined speed limit value being stored in said data memory, and wherein said data memory comprises a data field for storing different speed limit values corresponding to said parameters.

15. The device for controlling a starting process of claim 11, wherein said predetermined speed limit value is lower than a crankshaft speed at which said engine delivers its maximum moment.

16. The device for controlling a starting process of claim 15, wherein said control device is operatively connected for establishing a higher predetermined speed limit value after an interrupted starting attempt with high clutch moment.

17. The device for controlling a starting process as in claim 15, wherein said control device is operatively connected for establishing a higher predetermined speed limit value after an interrupted starting process.

18. The device for controlling a starting process of claim 11, wherein said control device is operatively connected for nullifying said predetermined speed limit after detection of an interrupted starting process or starting attempt.

19. The device for controlling a starting process of claim 11, further comprising an operating element connected to said control device for selectively nullifying said predetermined speed limit.

20. The device for controlling a starting process of claim 11, wherein said control device is operatively connected for activating said actuator for maintaining said crankshaft speed to said predetermined speed in response to receiving a signal indicating that said crank shaft has reached said predetermined speed limit during the starting process.

21. The device for controlling a starting process of claim 17, wherein said control device is operatively connected for activating said actuator for maintaining said crankshaft speed to said predetermined speed during unreduced activation of said accelerator pedal during the starting process.

22. The device for controlling a starting process of claim 11, wherein said control device further comprises a transition controller for ensuring a continuous transition of the engine moment to the value corresponding to the accelerator pedal position immediately following the point at which a synchronous speed of said crankshaft and said gear input shaft is reached.

* * * * *